United States Patent
Nomura

[11] Patent Number: 5,610,899
[45] Date of Patent: Mar. 11, 1997

[54] OPTICAL HEAD MOVING SECTION OF OPTICAL DISK DRIVE

[75] Inventor: Tadashi Nomura, Tokyo, Japan

[73] Assignee: NEC Corporation, Tokyo, Japan

[21] Appl. No.: 523,849

[22] Filed: Sep. 5, 1995

Related U.S. Application Data

[63] Continuation of Ser. No. 124,390, Sep. 20, 1993, abandoned.

[30] Foreign Application Priority Data

Sep. 22, 1992 [JP] Japan .................................. 4-252421

[51] Int. Cl.⁶ .................................................. G11B 17/00
[52] U.S. Cl. .................................................. 369/249
[58] Field of Search ........................... 369/249, 44, 248, 369/244, 220, 219, 215; 359/811, 830; 360/106, 105

[56] References Cited

U.S. PATENT DOCUMENTS

| | | | |
|---|---|---|---|
| 4,613,962 | 9/1986 | Inoue et al. ................................ | 360/107 |
| 4,823,336 | 4/1989 | Inada et al. ................................ | 369/249 |
| 5,016,238 | 5/1991 | Shtipelman et al. ....................... | 369/249 |
| 5,046,062 | 9/1991 | Yamashita ................................... | 369/249 |

FOREIGN PATENT DOCUMENTS

| | | | |
|---|---|---|---|
| 61-105779 | 5/1986 | Japan ....................................... | 360/106 |
| 61-206929 | 9/1986 | Japan ....................................... | 369/249 |
| 2220231 | 9/1990 | Japan ....................................... | 369/270 |
| 0587498 | 1/1978 | U.S.S.R. ................................... | 360/106 |

*Primary Examiner*—Robert S. Tupper
*Assistant Examiner*—Allen Cao
*Attorney, Agent, or Firm*—Laff, Whitesel, Conte & Saret, Ltd.

[57] ABSTRACT

An optical disk drive includes a spindle motor fixed on a base, a moving section carrying an optical head, a plurality of rolling members carried by the moving section, a pair of rails fixed on the base and carrying the rolling members for moving the moving section to any target position of a disk medium. A ferromagnetic member is fixed on the base and a permanent magnet fixed to the moving section faces the ferromagnetic member with a predetermined space being provided with respect to the ferromagnetic member. With this arrangement, the disk drive requires only five rolling member. Due to a magnetic attracting force produced between the ferromagnetic member and the permanent magnet, the moving section and the rail members are under appropriate pressure contact, which makes it possible to provide a simple, compact and low cost pressure contact mechanism.

4 Claims, 2 Drawing Sheets

5,610,899

OPTICAL HEAD MOVING SECTION OF OPTICAL DISK DRIVE

This application is a continuation, of application Ser. No. 08/124,390, filed Sep. 20, 1993, now abandoned.

BACKGROUND OF THE INVENTION

(1) Field of the Invention

The present invention relates to an optical disk drive, and more particularly to an optical head moving section of an optical disk drive.

(2) Description of the Related Art

In a conventional optical disk drive, a moving section is constituted by an optical head or a part of the optical head, and a guide structure therefor is constituted by a plurality of rolling members provided to the moving section and a pair of rails fixed on a base of the disk drive. The plurality of rolling members are in a rolling contact with the pair of rails under pressure, whereby the moving section is maintained in a state in which, due to the above guide structure, the moving section is allowed to move along a surface of a disk medium.

FIG. 1 diagrammatically shows a side view of a relevant portion of such conventional optical disk drive which has as a guide structure six rolling members 1a–1f each having a cylindrical outer surface and a pair of rails 2a, 2b. As seen in FIG. 1, in order to maintain the moving section 3 in the required position, one of the rolling members 1a–1f, that is, the rolling member 1b is held by the moving section 3 through a spring member such as a plate-spring 4 which urges the rolling member 1b to a certain fixed direction. FIG. 1 shows that the rolling member 1b is inclined by 45 degrees and pressed against the rail 2a by the spring 4 which is fixed to the moving section 3 and whose spring force urges the rolling member 1b against the rail 2a. The rolling member 1b together with the rail 2a restricts the movement of the moving section 3 to the left along the X-axis shown in FIG. 1 and also restricts the upward movement thereof along the Z-axis. The rolling members 1e and 1f are fixed to the moving section 3 with 45 degree inclination, and they together with the rail 2b restrict the movement of the moving section 3 to the right on the X-axis and also restrict the upward movement thereof along the Z-axis. The rolling members 1a, 1c and 1d vertically in contact with the rails 2a and 2b restrict the downward movement of the moving section 3. Hence, the moving section 3 is allowed to move freely along only the Y-axis (shown in FIG. 2B). In the conventional disk drive using such rolling members, at least six of them are required in order to be able to maintain a stable operating posture of the disk drive.

The problems in the conventional optical disk drive described above include the following. To realize the pressing means utilizing a spring as explained above, the structure becomes complex with the disk drive becoming large and costly. Also, although the rolling members having cylindrical outer surfaces are less costly by themselves, the number of the rolling members required is large with the minimum number being six and this makes the overall cost high. Furthermore, the complexity of the structure inevitably involves a larger number of manufacturing steps resulting in lower precision and higher manufacturing cost.

SUMMARY OF THE INVENTION

It is, therefore, an object of the present invention to overcome the problems existing in the conventional optical disk drive and to provide an improved moving section of the optical disk drive which is simple in its construction and which can be made with low cost.

According to one aspect of the invention, there is provided an optical disk drive comprising:

a spindle motor which is fixed on a base and supports and rotates a disk medium;

a moving section which carries thereon an optical head member for reading/writing/erasing data on the disk medium;

a plurality of rolling members which are carried by the moving section;

a pair of rails which are fixed on the base and carry the rolling members for moving the moving section to any target position of the disk medium;

a ferromagnetic member which is fixed on the base; and a permanent magnet which is fixed to the moving section and faces the ferromagnetic member with a predetermined space being provided with respect to the ferromagnetic member.

According to the invention, since the optical disk drive is provided with the ferromagnetic member fixed to the base of the disk drive and the permanent magnet fixed to the moving section, there is produced an attracting force between them and the moving section is constantly under an appropriate pressure towards the rails through the rolling members. Thus, unlike the conventional drive in which the moving section is required to be pressed by a complex structure utilizing a spring means, the drive provided by the present invention can be simple, compact and reliable for maintaining the posture of the moving section and allowing the moving section to move along the rails, and also can be manufactured economically.

BRIEF DESCRIPTION OF THE DRAWINGS

The above and other objects, features and advantages of the present invention will be apparent from the following description of preferred embodiments of the invention explained with reference to the accompanying drawings, in which.

DESCRIPTION OF PREFERRED EMBODIMENTS

Now, preferred embodiments of the invention are explained with reference to the accompanying drawings.

Figure 2A:
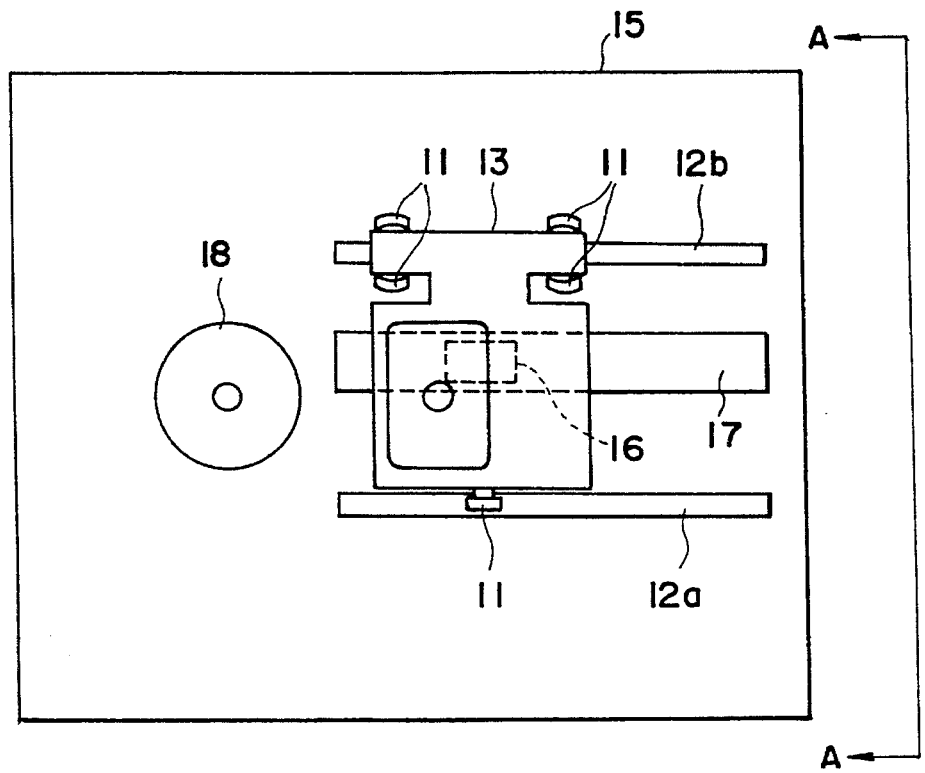
FIG. 2A is a diagrammatic plan view of a moving section of the optical disk drive of a first embodiment according to the invention.
Figure 2B:
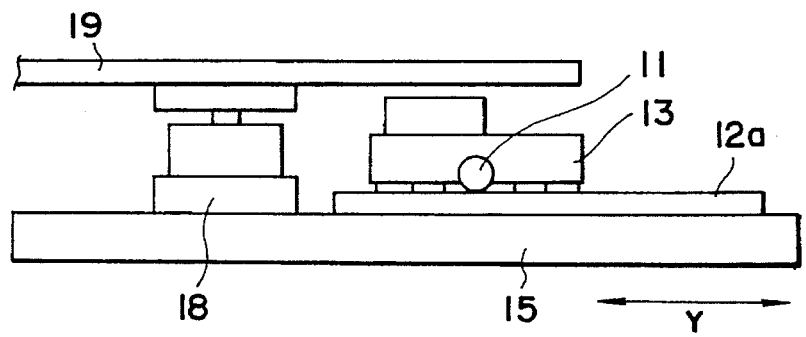
FIG. 2B is a diagrammatic side view of the moving section of the disk drive of the first embodiment according to the invention;.
Figure 2C:
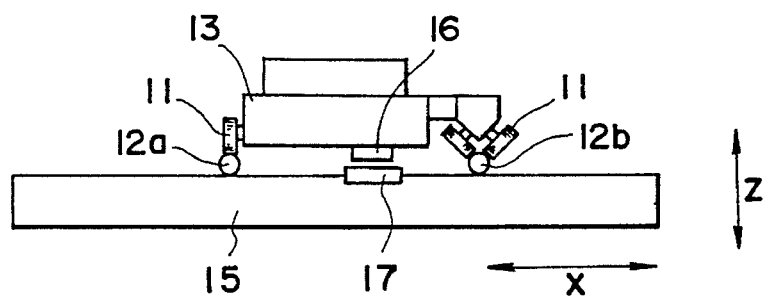
FIG. 2C is a diagrammatic front view of the moving section of the disk drive viewed in the directions of lines with arrows A—A in FIG. 2A.

As seen in FIGS. 2A–2C which diagrammatically illustrate an optical disk drive of a first embodiment according to the invention, the moving section 13, that is, an optical head member is carried, through five rolling members 11 which are provided on the moving section 13 and each of which has a cylindrical outer surface, on a pair of rails 12a and 12b fixed on a base 15 of the disk drive. A permanent magnet 16 fixed to the moving section 13 and a ferromagnetic member 17 fixed to the base 15 face with each other and, due to a magnetic attracting force between them, the moving section 13 is held in a predetermined position and allowed to move or slide on the rails 12a and 12b.

A spindle motor 18 is fixed on the base 15, and a disk medium 19 which is inserted or loaded externally of the optical disk drive is held to rotate parallelly with respect to the two rails 12a and 12b. The moving section 13 or the optical head member is moved to a given targeted location in the diametric direction of the disk medium 19 by a driving means (not shown) and performs the necessary writing/reading or erasing of data on the disk medium 19 on instructions from a control circuit (not shown).

Of the five rolling members 11, one is in rolling contact with one of the rails (the first rail 12a) and the remaining four are in rolling contact with the other one of the rails (the second rail 12b). Two each of the four rolling members 11 are paired and, at two locations appropriately spaced with each other longitudinally of the second rail 12b, the paired rolling members in contact with the second rail 12b are inclined 45 degrees from both sides thereof to the second rail 12b. The one rolling member 11 in contact with the first rail 12a is directed vertically down to the first rail 12a. The permanent magnet 16 is fixed to the moving section 13 in such a way that its exposed surface is substantially parallel to the surface of the disk medium 19, and the ferromagnetic member 17 is fixed to the base 15 so as to be positioned parallel to and immediately below the exposed surface of the permanent magnet 16.

When the disk drive is arranged as above, the permanent magnet 16 and the ferromagnetic member 17 generate between them a magnetic attracting force in the direction along the Z-axis in FIG. 2C and, due to this attracting force, all the rolling members 11 provided to the moving section 13 are forced to be in rolling contact with the pair of rails 12a and 12b under an appropriate pressure. For convenience of the explanation, the showing of the disk medium 19 is omitted in FIG. 2A and also the showing of the spindle motor 18 and the disk medium 19 is omitted in FIG. 2C.

Figure 1:
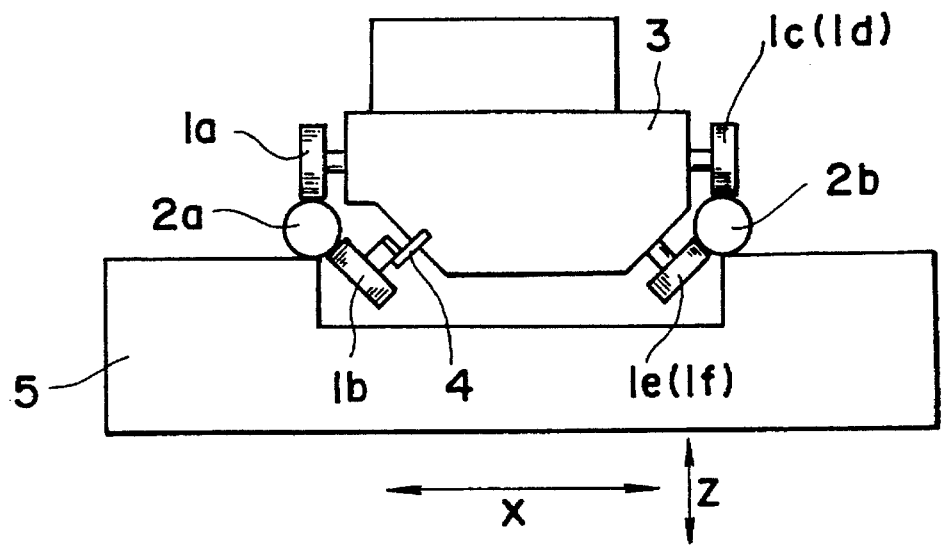
FIG. 1 is a diagrammatic side view of a relevant portion of a conventional optical disk drive.
Figure 3:
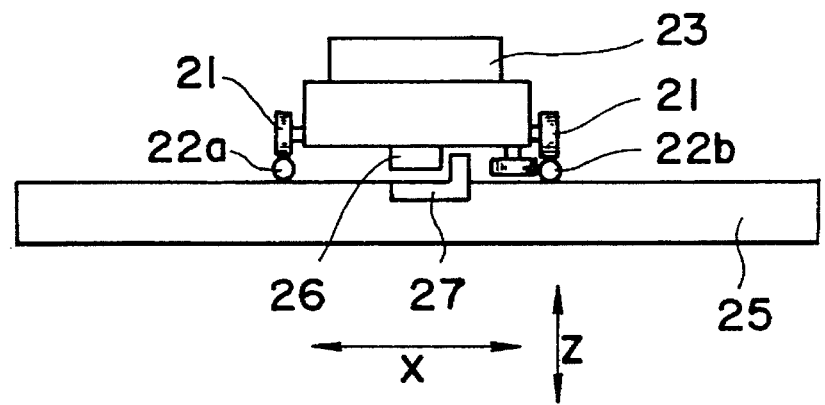
FIG. 3 is a diagrammatic side view of the moving section of the disk drive of a second embodiment according to the invention.

Next, FIG. 3 is a diagrammatic front view of a disk drive of a second embodiment according to the invention, the view corresponding to that of FIG. 2C of the above explained first embodiment.

In the arrangement of this second embodiment, two pairs of rolling members having the same configuration, each pair being formed by two rolling members 21, are in rolling contact with the second rail 22b at two locations appropriately spaced with each other longitudinally of the second rail 22b, and one rolling member 21 is in rolling contact with the first rail 22a in such a manner that it is vertically directed to the first rail 22a. It should be noted that, unlike in the arrangement of the first embodiment shown in FIGS. 2A–2C, one of the paired rolling members 21 in contact with the second rail 22b is vertically directed to the second rail 22b and the other one of the paired rolling members 21 is horizontally directed to the same second rail 22b. The permanent magnet 26 is fixed to the moving section 23 in such a way that a first exposed surface thereof is substantially parallel to the surface of the disk medium (not shown) and that a second exposed surface thereof is substantially vertical to the disk medium and parallel to the longitudinal direction of the second rail 22b. The ferromagnetic member 27 is formed in an L-shape in section, and two inner surfaces thereof face the first surface and the second surface of the permanent magnet 26 in parallel, respectively.

When arranged as above, the permanent magnet 26 and the ferromagnetic member 27 generate between them a magnetic attracting force in the direction along the Z-axis and another magnetic attracting force in the direction along the X-axis, so that all the rolling members 21 provided to the moving section 23 are forced to be in rolling contact with the pair of rails 22a and 22b under an appropriate pressure.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical disk drive comprising:
    a spindle motor (18) which is fixed on a base (15, 25), said spindle motor supporting and rotating a disk medium (19);
    a moving section (13, 23) which carries thereon an optical head member for reading/writing/erasing data on said disk medium;
    five rolling members (11, 21) which are carried by said moving section, each of said five rolling members having a cylindrical outer surface;
    a pair of rails (12a, 12b; 22a, 22b) which are fixed on said base and which carry said rolling members for moving said moving section to any target position of said disk medium;
    a ferromagnetic member (17, 27) which is fixed on said base; and
    a permanent magnet (16, 26) which is fixed to an undersurface of said moving section and which faces said ferromagnetic member within a predetermined space relative to said ferromagnetic member wherein a magnetic attracting force between said permanent magnet and said ferromagnetic member holds said moving section against said pair of rails.

2. An optical disk drive according to claim 1, in which said pair of rails are located at substantially equal distances from said disk medium, each of said rails having an upper surface and a lower surface, four of said five rolling members are in contact with said upper surface of one (12b) of said rails with axes of rotation being inclined to mutually form a 90-degree angle centered on a top of said one of said rails, an apex of said 90-degree angle pointing toward said disk medium, said axes of rotation being divergently at substantially a 45 degree angle with respect to a surface of said disk medium, the remaining one of said five rolling members being in contact with the other (12a) of said rails with its axis of rotation being parallel with the surface of said disk medium, and the axes of rotation of all of said five rolling members are perpendicular to a moving direction of said moving section.

3. An optical disk drive according to claim 1, in which said ferromagnetic member has an L-shape in section, and a lower exposed surface and one of exposed side surfaces of said permanent magnet face two inner surfaces of said L-shaped ferromagnetic member.

4. An optical disk drive according to claim 3, in which said pair of rails are at substantially equal distances from said disk medium, four of said five rolling members are in contact with one of said rails with two rolling members out of said four having their axes of rotation vertically directed with respect to a surface of said disk medium and the remaining two rolling members out of said four having their axes of rotation parallelly directed with respect to the surface of said disk medium, the remaining one of said five rolling members is in contact with the other of said rails with its axis of rotation parallelly directed with respect to the surface of said disk medium, and the axes of rotation of all of said five rolling members are perpendicular to a moving direction of said moving section.

\* \* \* \* \*